June 28, 1938. J. H. CLEWELL 2,122,246
METHOD OF MAKING ORNAMENTAL PLASTIC RODS
Filed June 24, 1936
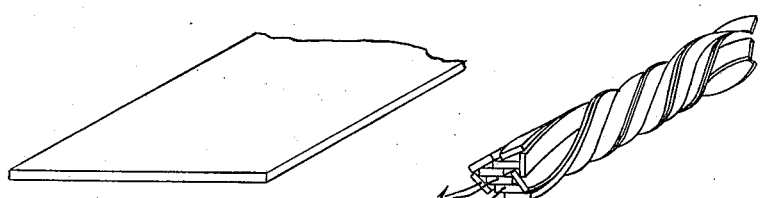
Fig. 1  Fig. 2
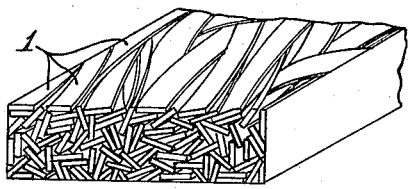 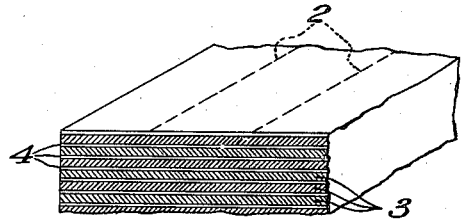
Fig. 3  Fig. 4
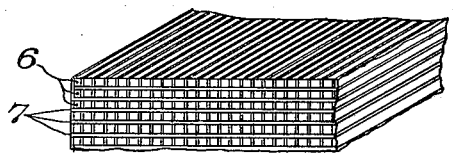 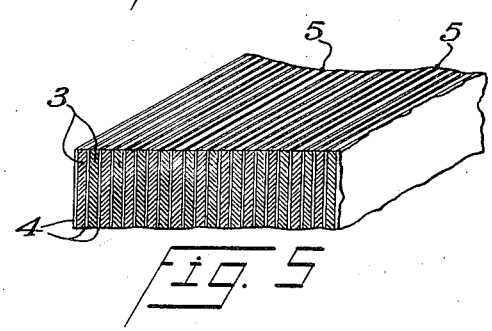
Fig. 6  Fig. 5
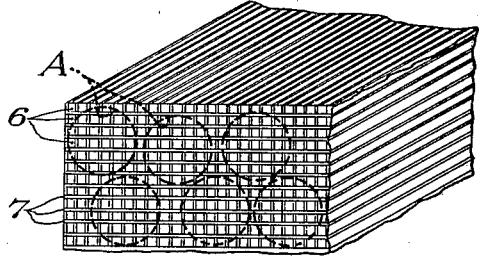 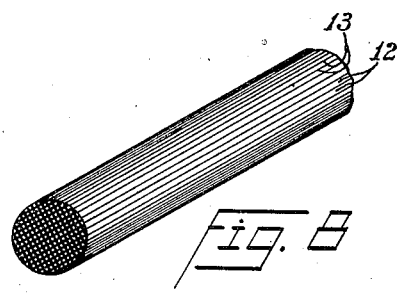
Fig. 7  Fig. 8
John H. Clewell   INVENTOR
BY  *J. M. Castle Jr.*
ATTORNEY Patented June 28, 1938

2,122,246

UNITED STATES PATENT OFFICE 2,122,246

METHOD OF MAKING ORNAMENTAL PLASTIC RODS

John H. Clewell, Arlington, N. J., assignor, by mesne assignments, to E. I. du Pont de Nemours & Company, Wilmington, Del., a corporation of Delaware Application June 24, 1936, Serial No. 86,955

5 Claims. (Cl. 18—51)

This invention relates to the manufacture of an ornamental plastic rod and, more particularly, to a rod cut from a block of plastic and having substantially straight lengthwise stripes of intermittent pearlescent and non-pearlescent appearance, the rod being substantially uniform in general appearance over its whole peripheral surface.

The production of pearlescent sheets of plastic is well known in the art. The pearlescent effect is obtained by the use of various pigments such as fish scale essence, various synthetic pearl pigments, and metallic bronze powders. All of these pigments are characterized by being composed of flat lamellar particles and the bright pearlescent effect in the plastic sheets is obtained by orienting these lamellar particles in strata parallel to the surface of the sheet so that the light is reflected by the broad surfaces of the particles. If this orientation is not effected, the pearl pigments simply give the plastic sheet a dull, lusterless appearance.

The cutting of rods from a solid block of plastic is also well known in the art and is commonly used in the production of solid rods which are subsequently bored out to make fountain pen barrels, and the like.

An object of the present invention is to provide a method of making a cut ornamental plastic rod having a pattern consisting of substantially straight lengthwise stripes of intermittent pearlescent and non-pearlescent appearance, the rod being substantially uniform in general appearance over all of its peripheral surface. A further object is to provide a method of making a plastic block from which such a rod may be cut. A further object is to provide a method of making such a rod with substantially all of the pearl pigment particles oriented with their broad faces parallel to the major axis of the rod so that the intermittent pearlescent stripes shall be enhanced in brilliance. A still further object is to provide a rod as described in which the lengthwise intermittent pearlescent stripes are somewhat undulating in appearance, that is, the full pearlescent effect is intermittent along the stripe, being separated by segments of relatively non-pearlescent appearance, but the segments of pearlescent and non-pearlescent appearance blend into each other rather than being abruptly defined. Other objects of the invention will be apparent from the description given hereinafter.

The above objects are accomplished according to the present invention by making, in the manner explained below, a solid rectangular block of plastic having therein a plurality of regularly spaced, elongated, substantially square sectioned prisms containing lamellar pearl pigment particles, said particles being oriented in each prism in a series of interrupted helically curved strata with the broad faces of the particles parallel to the major axis of the prism, said prisms lying parallel to each other and to one side of the block and being separated from each other by a plastic of different appearance, and cutting rods from the block in a direction parallel to said prisms. Preferably, the sections of the prisms are not over 0.060″ on a side.

The process of making the plastic block described above is illustrated in the following example, reference being made to the accompanying drawing, wherein:

Figs. 1–7, inclusive, show perspective views, more or less diagrammatically, and with sections broken away for convenience in illustration, of the plastic at various stages during the production of the plastic block according to the present invention:

Fig. 8 is a perspective view of a rod cut from the plastic block shown in Fig. 7;

Figs. 1, 2, 3, and 8 are drawn to a much reduced scale as compared to Figs. 4–7, inclusive.

*Example 1.*—A mass of cellulose nitrate plastic of suitable consistency and containing fish scale essence, or other lamellar light reflecting pigment particles such as aluminum bronze, in suitable proportions, is extruded through an orifice in the manner disclosed in Higgins U. S. Patent 1,607,123 to give a slab about 0.125″ in thickness with the pigment particles oriented in strata parallel to the two broad surfaces of the slab. Fig. 1 shows such a slab.

The slab is then cut into strips about 0.375″ in width and of a length equal to that of the cake press chase in which the plastic is later to be pressed. The pigment particles will be oriented in strata parallel to the broad surfaces of these strips. Elongated bundles, (as illustrated in Fig. 2) are made by taking ten to fifteen of these strips 1 at each end and turning them in opposite directions to twist the strips tightly about each other lengthwise. This twisting results in forming the strips 1 in roughly helical curves about each other and, consequently, the strata of oriented pigment particles are likewise disposed in roughly helical curves but the broad surfaces of the particles in general lie parallel to the major axis of the elongated bundles. The end of the bundles is substantially non-pearlescent in appearance due to this orientation of the pigment particles.

The bundles thus formed are then laid lengthwise in a cake press chase and consolidated into a solid plastic block by heat and pressure according to well known cake pressing practice. The resulting block is illustrated in Fig. 3. This block is then sliced into sheets 0.025" in thickness and stacked alternatively with sheets 0.012" in thickness cut from a block of black cellulose nitrate plastic. This stack, illustrated in Fig. 4, is cut lengthwise along the dotted lines 2 into sections of rectangular cross section, the width of said sections being equal to the desired heighth of the plastic block to be subsequently formed. In Fig. 4 reference numeral 3 indicates the sheets cut from the block illustrated in Fig. 3 and reference numeral 4 indicates the black sheets.

As Figs. 4–7, inclusive, are drawn to a much larger scale than Figs. 1–3, it is only expedient to show a corner of the stack or block illustrated.

The sections above referred to are then assembled in the cake press chase with their cut surfaces forming the top and bottom of the new plastic block obtained by consolidating the sections under heat and pressure. Fig. 5 illustrates this block in which the sheets 3 and 4 are positioned vertically rather than horizontally. For purposes of illustration, heavy black lines 5 are shown to mark where the sections have been united, although in actual practice there will be no distinct line where the sections are joined.

The block thus made is then cut into sheets 0.025" in thickness and stacked alternatively with sheets of black cellulose nitrate plastic 0.012" in thickness, as shown in Fig. 6, wherein reference numeral 6 indicates the sheets cut from the block shown in Fig. 5 and reference numeral 7 designates the black sheets. The stacked sheets are then put into the cake press chase and consolidated under heat and pressure into a solid plastic block as shown in Fig. 7, from which rods are cut as indicated by the dotted lines at A.

Although making no difference, theoretically, in the geometric design of the block in Fig. 7, it has been found preferable in practice to cut or stack the sheets shown in Fig. 6 lengthwise into several rectangular sections, assemble them in the cake press chase in block formation with their cut surfaces forming the top and bottom of the block, and then consolidate the sections into a solid block of plastic under heat and pressure. This procedure is identical with that used in connection with the stack of sheets shown in Fig. 4 but is for a quite different purpose. Whereas the stack of sheets in Fig. 4 are cut lengthwise and turned 90° about their major axis to get the pearlescent and black sheets vertically disposed, the stack of sheets in Fig. 6 form a checkerboard design so that turning the sections 90° about their major axis does not affect the geometric pattern at all but does obviate the tendency the sheets have to distort and flow a little out of line when the stack of Fig. 6 is simply placed in the chase and consolidated into a solid block.

It will be understood that either treatment of the stack of sheets shown in Fig. 6 is the equivalent of the other and, aside from the incidental distortion of the sheets in carrying out the first described procedure, will make no difference in the block of Fig. 7, or in rods cut therefrom. If the first procedure is used and some distortion of the sheets results, it will show in a certain lack of continuity and deviation from a straight line of the stripes on the periphery of rods cut from the block.

By proceeding as above, the plastic rod shown in Fig. 7 is necessarily composed of a plurality of regularly spaced, elongated, substantially square sectioned prisms measuring 0.025" on a side, separated from each other by the black plastic which, at the end of the block appears as a reticulated black veining 0.012" in width. The rod is cut from the block in a direction parallel to these prisms.

Fig. 8 is a perspective view of a rod such as might be cut from the block of Fig. 7. As it is impossible to illustrate the undulating, intermittent pearlescent appearance of the stripes on the periphery of the rod, they are merely represented at 12 between separating stripes or layers of black plastic 13.

If all flow and distortion of the plastic throughout the various cake pressing steps were eliminated, the stripes 12 and 13 on the periphery of the rod would be perfectly straight and of consistent width throughout. Likewise, the lamellar pigment particles would all be oriented with their broad faces parallel to the major axis of the elongated prisms and of the rod and there would be absolutely no pearlescent appearance at the end of the rod. Due to the step of twisting the strips of pearlescent plastic the strata in which the lamellar pigment particles were oriented, are helically curved when the aforementioned bundles are made; this helically curved formation of the strata persists throughout the subsequent manipulative steps except that, as the pearlescent plastic gets sheeted and interlayed with black plastic, elongated prisms of the pearlescent plastic of small cross section are formed and, as a result, the helical curves of the strata are cut through so that each individual prism is composed of a series of interrupted helically curved strata.

Because of this unique formation in which the pigmented particles are oriented in the prisms, each prism at the periphery of the rod forms a lengthwise stripe having a highly attractive, undulating appearance caused by sections of pearlescent appearance fading into sections of non-pearlescent appearance, and vice versa. It will be understood that the pearlescent sections are those areas where the helically curved strata happen to approximately coincide with the periphery of the rod and hence the lamellar pigment particles all lie approximately parallel to the periphery of the rod and reflect light brilliantly; the non-pearlescent sections are those areas where the helically curved strata are at an angle to the periphery of the rod and hence the lamellar particles are presenting their narrow faces, or edges, toward the periphery of the rod and do not reflect light to any appreciable extent.

In actual practice, some flow and distortion of the plastic is inevitable but this, rather than being disadvantageous, adds to the attractive striped or grained appearance of the rod in making the design less regular and geometric, although giving a definite striped or grained effect. The stripes are not perfectly straight nor exactly uniform in width; also, as indicated by a few pearlescent spots on the end of the rod, a small proportion of the lamellar pigment particles have been flowed to such an extent that their broad faces lie at right angles rather than parallel to the major axis of the rod. This distortion is chiefly noticeable at the ends of the blocks where greater flow is apt to take place. In general, however, the stripes are substantially straight and substantially all of the broad faces of the pigment particles lie parallel to the major axis of the prisms and of the rod.

It will be understood that the above example is merely illustrative. Those skilled in the art will instantly appreciate that the invention is applicable not only to cellulose nitrate plastic but to thermoplastic materials generally, including cellulose acetate, cellulose propionate, cellulose butyrate, and mixed esters as cellulose nitroacetate, cellulose acetobutyrate, ethyl cellulose, benzyl cellulose, and other cellulose ethers, vinyl resins, aldehyde modified polyvinyl acetate, polystyrene, polymerized methyl methacrylate, and others.

Although it is essential that the elongated prisms in the rod should be composed of a plastic containing flat, lamellar light-reflecting pigment particles, it will be obvious that the plastic separating the said prisms may be either pearly in appearance or not, the only requirement being that it shall contrast in appearance from the prisms. This contrast may be caused by a difference in color, and/or the use of nonlight-reflecting pigment particles, or in other ways that will occur to those skilled in the art.

Without departing from the invention, wide variations may be made in the thickness and width of the pearl strips twisted into bundles and the thickness of the sheets cut from the plastic blocks at various stages in the process. Also, the pearl material may be colored, the strips of pearl material may comprise several different colors, and the sheets used in making the stacks may be in several different colors. All of these variations in color, dimensions of sheets used, and the like, are obvious to those skilled in the art and will be employed to obtain rods of varying appearance.

The consistency of the plastic to be used, that is, plasticizer and solvent content, the proportion of pigment to be used, and the handling of the plastic in the various cake pressing steps is commonplace knowledge to those familiar with "layups" and cake pressing operations in the plastics industry.

Although frequent reference has been made herein to "pearlescent" sheets, it will be understood that this term is intended not only to include sheets that actually look like pearl but to sheets having light-reflecting properties due to orientation of lamellar light-reflecting pigment particles. The invention is equally applicable to plastic pigmented with genuine fish scale essence, any one of the numerous synthetic fish scale essences, bronze flake pigments, and the like. It is an essential characteristic of the pigment particles that they shall be lamellar and light-reflecting.

An advantage of the present invention is that it provides a relatively simple method of producing a cut plastic rod having a highly attractive striped or grained appearance not heretofore attainable. The intermittent pearlescent appearance of the stripes on the periphery of the rod is particularly characteristic and pleasing.

As many apparently widely different embodiments of this invention may be made without departing from the spirit and scope thereof, it is to be understood that the invention is not limited to the specific embodiments thereof except as defined in the appended claims.

I claim:

1. Process of making a cut plastic rod having substantially straight lengthwise stripes of an intermittent pearlescent and non-pearlescent appearance, separated by plastic of different appearance, comprising forming a plurality of thin strips of plastic having lamellar light-reflecting pigment particles therein oriented in strata parallel to their broad faces, forming elongated bundles by twisting several of these strips together lengthwise, consolidating said bundles into a solid block of plastic, cutting sheets from said block and stacking said sheets alternatively with plastic sheets of different appearance, cutting the stack formed at right angles to said sheets to form a plurality of elongated rectangular sections, assembling said sections into block formation with the cut surfaces of said sections forming the top and bottom of said block and consolidating said assembly into a solid block of plastic, cutting sheets from said block and stacking said sheets alternatively with plastic sheets of different appearance, consolidating the stack formed into a solid block of plastic, and cutting plastic rods from said block in a direction parallel to the substantially straight square sectioned prisms of plastic containing the lamellar light-reflecting pigment particles, thus formed in said block.

2. Process of making a cut plastic rod having substantially straight lengthwise stripes of an intermittent pearlescent and non-pearlescent appearance, separated by non-pearlescent plastic, comprising forming a plurality of thin strips of plastic having lamellar light-reflecting pigment particles therein oriented in strata parallel to their broad faces, forming elongated bundles by twisting several of these strips together lengthwise, consolidating said bundles into a solid block of plastic, cutting sheets from said block and stacking said sheets alternatively with non-pearlescent plastic sheets, cutting the stack formed at right angles to said sheets to form a plurality of elongated rectangular sections, assembling said sections into block formation with the cut surfaces of said sections forming the top and bottom of said block and consolidating said assembly into a solid block of plastic, cutting sheets from said block and stacking said sheets alternatively with non-pearlescent plastic sheets, consolidating the stack formed into a solid block of plastic, and cutting plastic rods from said block in a direction parallel to the substantially straight, square sectioned prisms of plastic containing the lamellar light-reflecting pigment particles, thus formed in said block.

3. Process of making a cut plastic rod having substantially straight lengthwise stripes of an intermittent pearlescent and non-pearlescent appearance, separated by plastic of different appearance, comprising forming a plurality of thin strips of plastic having lamellar light-reflecting pigment particles therein oriented in strata parallel to their broad faces, forming elongated bundles by twisting several of these strips together lengthwise, consolidating said bundles into a solid block of plastic, cutting sheets about 0.025" thick from said block and stacking said sheets alternatively with non-pearlescent plastic sheets about 0.012" thick, cutting the stack formed at right angles to said sheets to form a plurality of elongated rectangular sections, assembling said sections into block formation with the cut surfaces of said sections forming the top and bottom of said block and consolidating said assembly into a solid block of plastic, cutting sheets about 0.025" thick from said block and stacking them alternatively with non-pearlescent plastic sheets about 0.012" thick consolidating the stack formed into a solid block of plastic, and cutting rods from said block in a direction parallel to the substantially straight, square sectioned prisms of plastic containing the lamellar light-reflecting pigment particles, thus formed in the block.

4. Process of making a cut plastic rod having substantially straight lengthwise stripes of an intermittent pearlescent and non-pearlescent appearance, separated by non-pearlescent plastic comprising forming a plurality of thin strips of cellulose nitrate plastic having lamellar light-reflecting pigment particles from the group consisting of fish scale essence and aluminum bronze particles, therein oriented in strata parallel to their broad faces, forming elongated bundles by twisting several of these strips together lengthwise, consolidating said bundles into a solid block of plastic, cutting sheets from said plastic and stacking said sheets alternatively with non-pearlescent cellulose nitrate plastic sheets, cutting the stack formed at right angles to said sheets to form a plurality of elongated rectangular sections, assembling said sections into block formation with the cut surfaces of said sections forming the top and bottom of said block and consolidating said assembly into a solid block of plastic, cutting sheets from said block and stacking them alternatively with non-pearlescent cellulose nitrate plastic sheets, consolidating the stack formed into a solid block of plastic, and cutting rods from said block in a direction parallel to the substantially straight, square sectioned prisms of plastic containing the fish scale essence particles, thus formed in the block.

5. Process of making a cut plastic rod having substantially straight lengthwise stripes of an intermittent pearlescent and non-pearlescent appearance, separated by plastic of different appearance, comprising forming a plurality of thin strips of plastic having lamellar light-reflecting pigment particles therein oriented in strata parallel to their broad faces, forming elongated bundles by twisting several of these strips together lengthwise, consolidating said bundles into a solid block of plastic, cutting sheets from said block and stacking said sheets alternatively with plastic sheets of different appearance, cutting the stack formed at right angles to said sheets to form a plurality of elongated rectangular sections, assembling said sections into block formation with the cut surfaces of said sections forming the top and bottom of said block and consolidating said assembly into a solid block of plastic, cutting sheets from said block and stacking said sheets alternatively with plastic sheets of different appearance, cutting the stack formed at right angles to said sheets to form a plurality of elongated rectangular sections, assembling said sections into block formation with the cut surfaces of said sections forming the top and bottom of said block and consolidating said assembly into a solid block of plastic, and cutting rods from said block in a direction parallel to the substantially straight, square sectioned prisms of plastic containing the lamellar light-reflecting pigment particles, thus formed in the block.

JOHN H. CLEWELL.